US006968365B2

(12) United States Patent
Hollström et al.

(10) Patent No.: US 6,968,365 B2
(45) Date of Patent: Nov. 22, 2005

(54) DEVICE AND A METHOD FOR OPERATING AN ELECTRONIC UTILITY DEVICE FROM A PORTABLE TELECOMMUNICATION APPARATUS (75) Inventors: Magnus Hollström, Lund (SE); Robert Hed, Lund (SE); Patrik Olsson, Malmö (SE); Magnus Tillgren, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 762 days.

(21) Appl. No.: 09/725,501

(22) Filed: Nov. 30, 2000

(65) Prior Publication Data
US 2001/0056502 A1 Dec. 27, 2001

Related U.S. Application Data (60) Provisional application No. 60/171,099, filed on Dec. 16, 1999.

(30) Foreign Application Priority Data

Dec. 1, 1999 (SE) .................................... 9904373

(51) Int. Cl.[7] .............................................. G06F 15/16
(52) U.S. Cl. ...................... 709/217; 709/203; 709/219; 455/556.1
(58) Field of Search .............................. 709/217, 250, 709/203, 219; 455/418, 419, 420, 454, 557, 455/556.1

(56) References Cited

U.S. PATENT DOCUMENTS

| 4,356,509 | A | * | 10/1982 | Skerlos et al. .............. 348/552 |
| 5,138,649 | A | | 8/1992 | Krisbergh et al. |
| 5,671,267 | A | * | 9/1997 | August et al. .............. 455/420 |
| 5,801,689 | A | * | 9/1998 | Huntsman ................... 345/733 |
| 5,806,005 | A | * | 9/1998 | Hull et al. .................. 455/566 |
| 5,906,657 | A | * | 5/1999 | Tognazzini ................. 709/248 |
| 5,983,100 | A | * | 11/1999 | Johansson et al. ....... 455/426.1 |
| 6,078,803 | A | * | 6/2000 | Fernandez Martinez .... 455/349 |
| 6,192,257 | B1 | * | 2/2001 | Ray .......................... 455/566 |
| 6,223,029 | B1 | * | 4/2001 | Stenman et al. ............ 455/420 |
| 6,223,291 | B1 | * | 4/2001 | Puhl et al. .................. 713/201 |
| 6,295,448 | B1 | * | 9/2001 | Hayes et al. ................ 455/420 |
| 6,317,609 | B1 | | 11/2001 | Alperovich et al. |

(Continued)

FOREIGN PATENT DOCUMENTS

EP 0 913 979 A2 5/1999

(Continued)

OTHER PUBLICATIONS

Wireless Application Protocol Architecture Specification, WAP Archtiecture, Version 30, Apr. 1998.

(Continued)

*Primary Examiner*—Ario Etienne
*Assistant Examiner*—Avi Gold
(74) *Attorney, Agent, or Firm*—Nixon & Vanderhye P.C.

(57) ABSTRACT

A server device has a programmable controller, a memory coupled to the controller, and a server program stored in the memory and executable by the controller. A first interface of the server device provides a first communication link to a portable telecommunication apparatus. A second interface connects the server device to an electronic utility device. The server program communicates with a client program in the portable telecommunication apparatus through the first interface. The server program also communicates with the electronic utility device through the second interface, so that digital information may be transferred between the portable telecommunication apparatus and the electronic utility device.

20 Claims, 4 Drawing Sheets

U.S. PATENT DOCUMENTS

| | | | |
|---|---|---|---|
| 6,349,324 B1 * | 2/2002 | Tokoro | 709/200 |
| 6,360,252 B1 * | 3/2002 | Rudy et al. | 709/206 |
| 6,449,495 B1 * | 9/2002 | Kuba | 455/557 |
| 6,532,298 B1 * | 3/2003 | Cambier et al. | 382/117 |
| 6,560,640 B2 * | 5/2003 | Smethers | 709/219 |
| 6,606,663 B1 * | 8/2003 | Liao et al. | 709/229 |
| 6,690,273 B2 | 2/2004 | Thomason | |
| 6,763,247 B1 * | 7/2004 | Hollstrom et al. | 455/352 |

FOREIGN PATENT DOCUMENTS

| | | |
|---|---|---|
| WO | 98/49818 | 11/1998 |
| WO | 98/59283 | 12/1998 |
| WO | 99/27742 | 6/1999 |
| WO | 99/52032 A1 | 11/1999 |

OTHER PUBLICATIONS

U.S. Appl. No. 09/714,884 filed Nov. 17, 2000.

* cited by examiner

DEVICE AND A METHOD FOR OPERATING AN ELECTRONIC UTILITY DEVICE FROM A PORTABLE TELECOMMUNICATION APPARATUS

This application claims the benefit of U.S. Provisional Application No. 60/171,099, filed 16 Dec. 1999, the entire content of which is hereby incorporated by reference in this application.

TECHNICAL FIELD

The present invention relates to the field of providing external accessibility to an electronic utility device and providing connectivity for the electronic utility device to a global information network, such as the Internet.

More specifically, the invention is directed at the use of a portable telecommunication apparatus together with a separate server device for accessing, controlling and operating an electronic utility device.

A portable telecommunication apparatus as set out above may for instance be a mobile or cellular radio telephone for GSM (Global System for Mobile Communication) or any other existing mobile telecommunications system. Moreover, an electronic utility device according to the above may be an advanced accessory for the mobile telephone, for instance a satellite navigation module (GPS), an FM radio or a digital video camera.

An electronic utility device according to the above may also be e.g. a video recorder, a digital camera, a television set, a hifi stereo, or an air conditioner.

The various examples of electronic utility devices given above all have in common that they may normally be operated by a remote control unit, such as an infrared remote control unit, in addition to a local user interface provided at a control panel of the device itself, such as a set of control buttons and LED indicators. Typically, a separate remote control unit is used for each individual electronic utility device.

Although some infrared remote control units are programmable and may therefore be adapted for use with several electronic utility devices, the existing approach has several drawbacks. First of all, remote control units have a tendency of disappearing in many homes, especially in families where small children are present. Furthermore, the various remote control units will have to be kept within reach of the intended user and will therefore occupy unnecessary storage space on desktops, table surfaces, etc. Moreover, the user interface of a typical remote control unit has a low level of user friendliness; the user interface is restricted to various small keys or buttons, at best in conjunction with a miniature LCD display. Finally, each type of remote control unit has its own philosophy behind the layout of the keys, etc, thereby making it hard for users to get familiar with all different types of remote control units.

Even if infrared remote control units are available for certain electronic utility devices, they have no capabilities of providing connectivity for the electronic utility device to a global information network, such as the Internet. Connectivity to e.g. the Internet is desired e.g. for distributing information (such as pictures captured by a digital camera) or for performing error reporting and trouble shooting together with a web-based helpdesk run by a manufacturer or supplier of the electronic utility device in question.

Other electronic utility devices, such as printers, telefax machines, copying machines, or home appliances such as refrigerators or microwave ovens, are usually not operated from an infrared control unit. Instead, the user of these devices is restricted to a normally very limited local user interface, such as a few control buttons and LED indicators, provided at a control panel of the device.

Consequently, there is a need for a well-defined, simple and inexpensive way for a manufacturer of electronic utility devices to provide remote accessibility to the device. Correspondingly, there is a need for a well-defined, simple and inexpensive way for the utility device manufacturer to provide connectivity for the utility device to a global information network, such as the Internet.

SUMMARY

It is an object of the present invention to provide an easier way of accessing, controlling and operating electronic utility devices in a standardized and user-friendly fashion. A second object of the invention is to drastically reduce the number of required remote control units, specifically so that only one control apparatus is required for a large number of electronic utility devices, which may exist in the environment around a user. A third object is to provide an opportunity of remote control of electronic utility devices that traditionally are not provided with such an option. A fourth object is to provide an option for various types of electronic utility devices to connect to a global information network, such as the Internet, by using a single type of communication device, namely a portable telecommunication apparatus.

The above objects have been achieved by the inventive understanding that remote accessibility as well as connectivity to e.g. the Internet may be provided for an electronic utility device through a portable telecommunication apparatus by the use of an intermediate stand-alone server device, which communicates with a client program in the portable telecommunication apparatus.

According to a preferred embodiment of the invention, a mobile WAP (Wireless Application Protocol) telephone having a built-in WAP browser is designed to connect via a point-to-point communication link to a stand-alone WAP server module or device through an accessories interface, such as a short-range radio link, an infrared link or a serial cable link. The WAP server module is provided with an embedded WAP server and an interface for connecting to an electronic utility device. The electronic utility device stores information related to the device functionality in the form of WML (Wireless Markup Language) pages and WML scripts. This information may be transferred to the WAP server of the WAP server module, which in turn may forward the information to the WAP client of the portable telecommunication apparatus to be presented to a user. Control information may be entered by the user through the WAP client and transferred to the WAP server and, ultimately, the electronic utility device, so that the functionality thereof may be remotely controlled from the portable telecommunication apparatus.

A solution to the above objects is defined by the appended independent patent claims. Other features, advantages and objects of the invention will appear from the following detailed disclosure of a preferred embodiment, from the appended drawings as well as from the subclaims.

BRIEF DESCRIPTION OF THE DRAWINGS

The present invention will now be described in more detail with reference to the appended drawings, in which.

DETAILED DESCRIPTION

Figure 1:
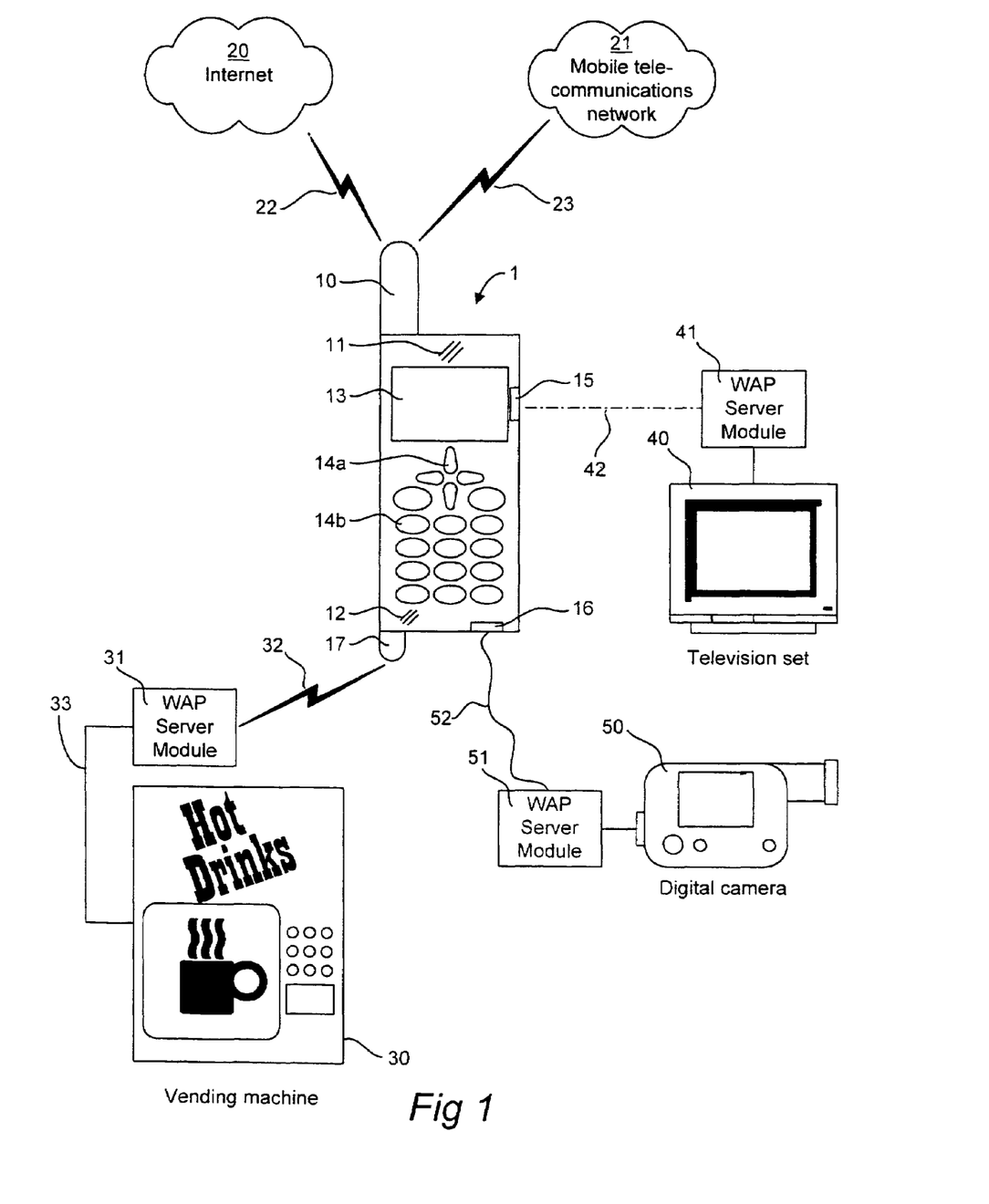
FIG. 1 is a schematic illustration of a mobile WAP telephone, which may be used for accessing the Internet, for performing traditional mobile telecommunications service calls (voice, data and fax), and for accessing, controlling and operating a plurality of electronic utility devices through stand-alone WAP server modules.

FIG. 1 is intended to illustrate the general inventive concept according to the present invention, i.e. that a user of a mobile telephone 1 or another type of portable telecommunication apparatus will be able to access, control and operate a plurality of telephone accessories, home appliances or other external electronic utility devices 30, 40, 50 through a WAP browser built into the mobile telephone. To this end, each electronic utility device 30, 40, 50 is connected (as indicated by reference numeral 33) to a respective WAP server module 31, 41, 51, from which the WAP browser of the mobile telephone 1 will receive encoded WML pages. The pages transmitted from the WAP server module 31, 41, 51 to the mobile telephone 1 represent the services, functionalities and applications, which are offered by the respective electronic utility device 30, 40, 50. As will be described in more detail below, the information contents of the WML pages may change dynamically, and moreover the user may feed back information to the respective utility device 30, 40, 50 by e.g. filling in WML forms and pushing the information back to the WAP server module 31, 41, 51 and the utility device 30, 40, 50. In this way, the user of the mobile telephone 1 may operate the respective utility device 30, 40, 50 and control the functionality thereof.

As shown in FIG. 1, the mobile telephone 1 comprises an antenna 10, which in a conventional way is used for connecting the mobile telephone 1 to a mobile telecommunications network 21 through a radio link 23. In a well-known way, the mobile telecommunications network 21, for instance GSM, offers voice, data and fax call services to the user of the mobile telephone 1. By means of the antenna 10, the user of the mobile telephone 1 may also access the Internet 20, or another global information network, by using the built-in WAP browser of the mobile telephone 1. To this end, graphic information and/or text is presented on a display 13, and a set of cursor navigation keys 14a are provided in a keypad together with a set of ordinary mobile telephone keys 14b. The latter comprise e.g. a YES/OK/ANSWER key, a NO/CANCEL/HANG UP key, numeric keys 0–9 as well as other character keys, such as * and #.

As is well known, the mobile telephone 1 also comprises a loudspeaker 11 and a microphone 12. Moreover, the mobile telephone 1 of the preferred embodiment shown in FIG. 1 comprises an infrared interface 15, such as an IrDA port, by means of which the mobile telephone 1 may be connected via a first WAP server module 41 to a first electronic utility device in the form of a television set 40 in FIG. 1.

The mobile telephone 1 also comprises a system or accessories connector 16, by means of which the mobile telephone 1 may be connected, through a serial cable 52 (e.g. RS232) and a second WAP server module 51, to a second electronic utility device in the form of a digital camera 50 of FIG. 1.

The mobile telephone 1 additionally comprises a second antenna 17 for establishing a short-range radio link 32, such as a Bluetooth link, to a third electronic utility device in the form of a vending machine in FIG. 1, via a third WAP server module 31.

Figure 2:
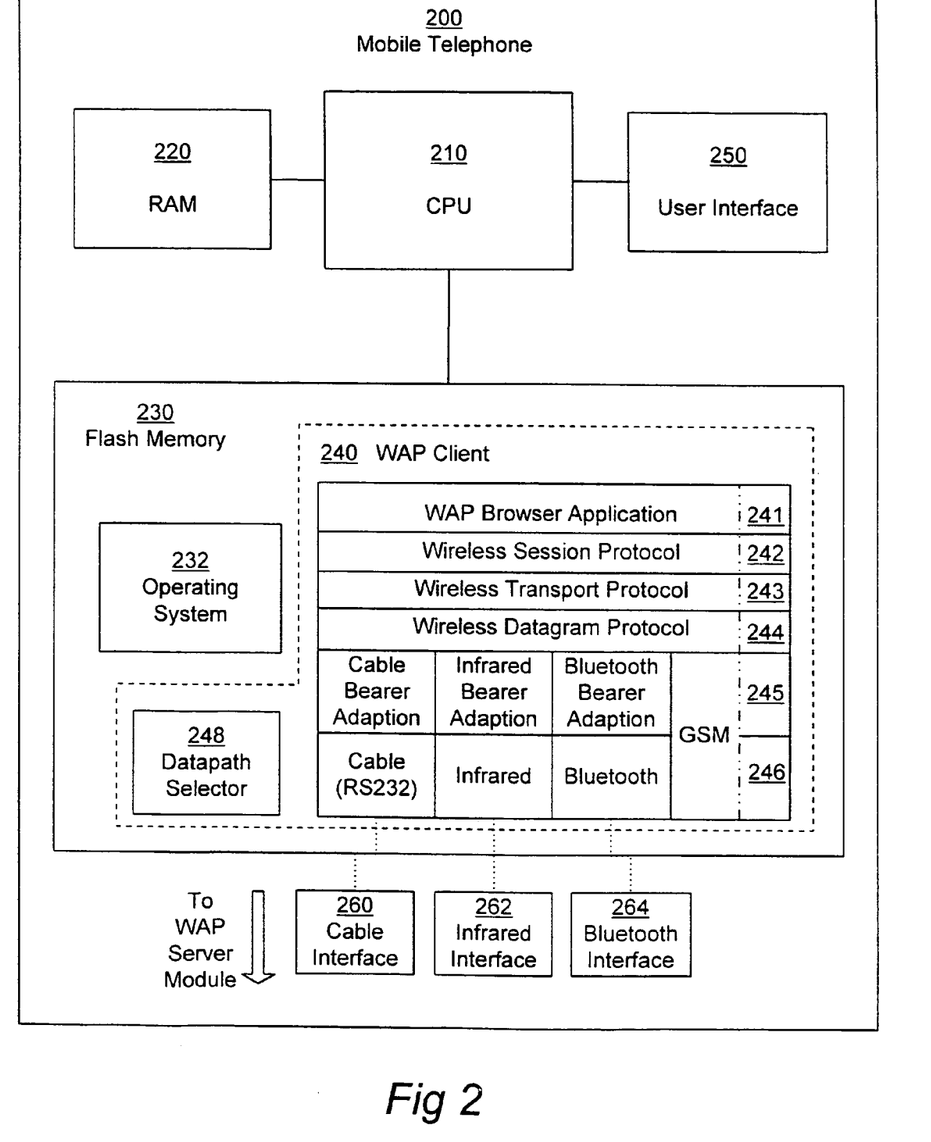
FIG. 2 is a schematic block diagram of the mobile telephone of FIG. 1.

An essential portion 200 of the mobile telephone 1 is shown in FIG. 2. A controller or CPU 210 is coupled to a random access memory 220 and to drivers 250 for the user interface formed by the display 13 and the keypad 14a–b. The controller 210 is also connected to a permanent memory 230 in the form of a flash memory. The flash memory 230 comprises an operating system 232 as well as an information access program in the form of a WAP client 240, which will be described in more detail below. The mobile telephone also comprises physical interfaces 260, 262 and 264 for the external device interfaces 15, 16 and 17 in FIG. 1. In more detail, interface 260 is an RS232 module for the system or accessories connector 16, interface 262 is an IrDA module, and interface 264 is a Bluetooth module.

As shown in FIG. 2, the WAP client 240 comprises a stack of protocols 241–246 as well as a datapath selector 248, the purpose of which will be described later. On a first level or top level 241 a WAP browser application is provided, which when executed by the controller 210 will form a graphical user interface on the display 13 and allow the user to access the respective WAP server modules 31, 41, 51 of the available electronic utility devices 30, 40, 50. A second level 242 is a wireless session protocol. As a third and fourth level, respectively, a wireless transport protocol and a wireless datagram protocol are provided, respectively. The protocols 241–244 are all essentially known per se and are not described in more detail herein.

On a fifth level 245 a respective adaption layer is provided for the serial cable interface 16, 260, the infrared interface 15, 262 and the Bluetooth interface 17, 264. The physical layer of the respective interface is provided as a sixth protocol level 246. The adaption layer 245 thus adapts the overlying wireless datagram protocol 244 to three different bearers, i.e. cable, infrared and Bluetooth.

Moreover, a GSM layer 245, 246 is also provided, as is generally known in the field of mobile WAP telephones, for providing the first communication link 22 between the antenna 10 and the Internet 20(FIG 1).

The purpose of the datapath selector 248 is to direct WML requests from the WAP browser 241 to either the first communication link 22 (through a circuit-switched GSM data call connection or through SMS-Short Messages Services), or to the respective external device interface 16, 52, 260 (cable), 15, 42, 262 (infrared) and 17, 32, 164 (Bluetooth). In the preferred embodiment, this differentiation is achieved through a new address scheme for the Uniform Resource Identifier (URI)/Uniform Resource Locator (URL). For instance, when access is to be made across the first communication link 22 to ordinary web sites on the Internet 20, the ordinary URI/URL format "http:// . . . " may be used. Conversely, when any of the electronic utility devices 30, 40, 50 is to be accessed, the URI/URL may look like: "local://. . . ".

Figure 3:
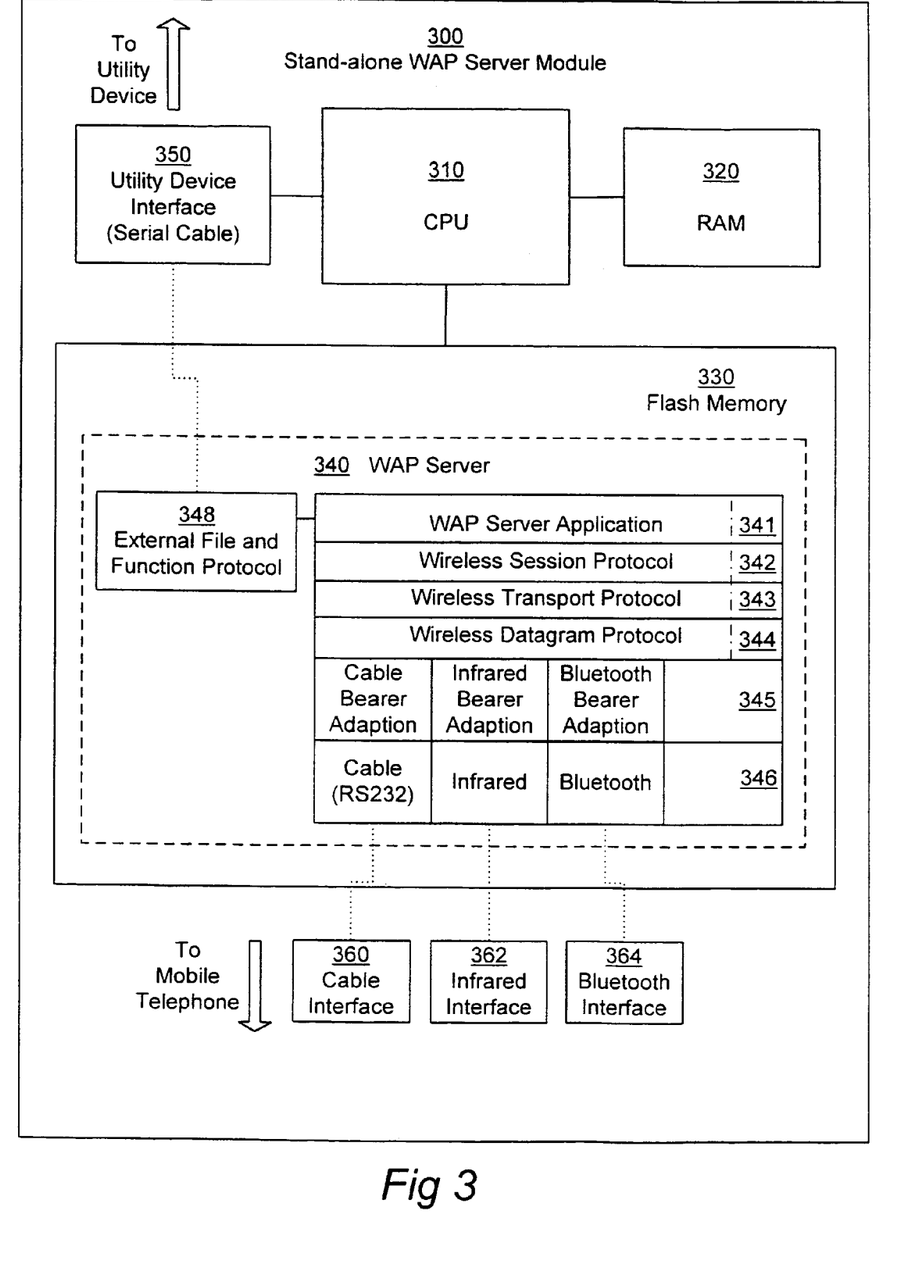
FIG. 3 is a schematic block diagram of a stand-alone WAP server module according to a preferred embodiment of the invention.

FIG. 3 is a schematic illustration of an essential portion 300 of any of the stand-alone WAP server modules 31, 41, 51 shown in FIG. 1. A controller or CPU 310 is connected to a random access memory 320 and a non-volatile memory 330, which is a flash memory in the preferred embodiment.

The flash memory comprises an embedded WAP server 340, which will be described in more detail below.

The WAP server module 300 further comprises a utility device interface 350, which will be used for operatively coupling the WAP server module to its electronic utility device. Consequently, the vending machine 30 in FIG. 1 will be physically connected to its WAP server module 31 through a serial cable 33, the utility device interface 350 of the WAP server module 31 and a corresponding physical interface in the vending machine 30. Even if a serial cable 33 is used according to the preferred embodiment, the WAP server module may be connected to its electronic utility device by another communication link than a serial cable.

Referring back to FIG. 3, the WAP server module 300 finally comprises physical interfaces for connecting to the mobile telephone 1 in the form of a cable interface 360 (link 52 in FIG. 1), an infrared interface 362 (link 42 in FIG. 1) and a Bluetooth interface 364 (link 32 in FIG. 1).

The WAP server 340 comprises a stack of protocols 341–346, which correspond to the stack of protocols 241–246 in the mobile telephone 200 shown in FIG. 2. At the top level a WAP server application protocol 341 is provided. Then follows a wireless session protocol 342, a wireless transport protocol 343, a wireless datagram protocol 344, an adaption layer 345 for different physical interfaces (cable, infrared or Bluetooth) and, finally, a physical interface layer 346. Preferably, the protocol stack of the WAP server 340 is adapted to all possible bearers, even if only one physical bearer 360 is used (such as either cable, infrared or Bluetooth). This makes it easier to design a generic stand-alone WAP server module 300.

The WAP server 340 further comprises an external file and function protocol 348 which is used for communicating with the electronic utility device 30, 40, 50 (illustrated in more detail in FIG. 4) through the utility device interface 350 and the physical link 33.

Figure 4:
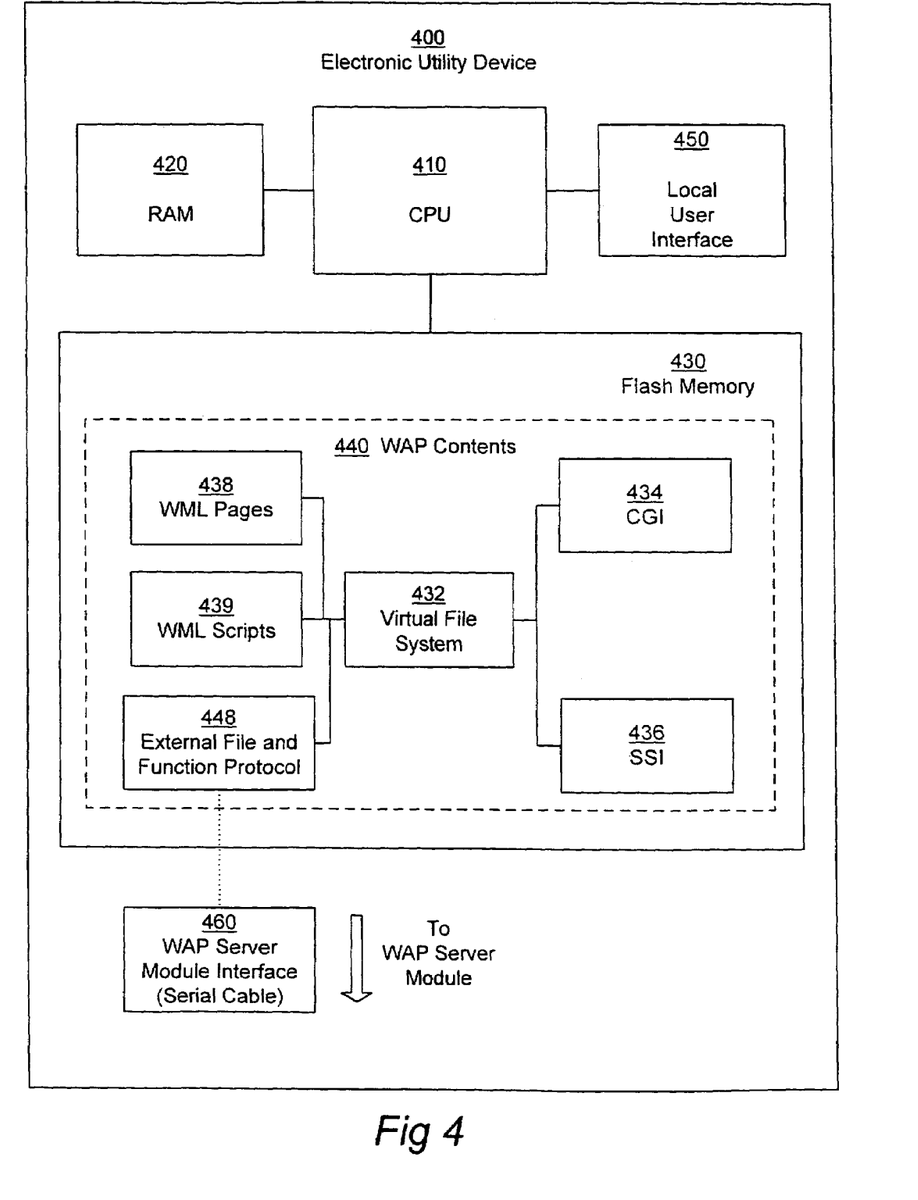
FIG. 4 is a schematic block diagram of one of the external utility devices of FIG. 1.

FIG. 4 is a schematic illustration of an essential portion 400 of any of the electronic utility devices shown in FIG. 1, i.e. the vending machine 30, the television set 40 or the digital camera 50. A controller or CPU 410 is connected to a random access memory 420 and a driver 450 for a local user interface. The local user interface may for instance be buttons for capturing, deleting or scrolling through pictures and a miniature LCD display on the digital video camera 50, program selection buttons, volume controls, brightness controls, etc, on the television set 40, or buttons for choosing among e.g. coffee, tea, cappuccino or espresso on the vending machine 30.

The controller 410 is coupled to a non-volatile memory 430, which is a flash memory in the preferred embodiment. The flash memory 430 comprises digital information (WAP contents 440), which constitute the contents that will be supplied by the WAP server module 300 to the mobile telephone 1, 200.

The electronic utility device 400 also comprises a WAP server module interface 460 for connecting the electronic utility device 400 to the WAP server module 300 through e.g. a serial cable.

The WAP contents 440 comprise a virtual file system 432, which has the purpose of storing a plurality of WML pages 438 and a plurality of WML scripts 439 in a structured and readable way. The WAP contents 440 also comprise Server Side Include (SSI) functions 436, which enable a program developer to insert directives inside the WML code to instruct the WAP server module 340 to replace the directive with a dynamic content upon retrieval of the WML code.

The WAP contents 440 also comprise Common Gateway Interface (CGI) functions 434 for enabling user input from the WAP client of the mobile telephone 1 to the WAP server module 340 and the utility device 400. The Common Gateway Interface functions 434 are a set of CGI routines that, when executed by the controller 410, controls a respective aspect or parameter of the functionality provided by the electronic utility device 400. For instance, if the utility device 400 is a digital camera 50, different CGI routines are provided for controlling e.g. the picture resolution, for scrolling through pictures stored in the camera, for capturing a new picture, for setting date/time, etc.

The WML pages 438 and the WML scripts 439 are preferably stored as pre-compiled binary WML files. Alternatively, the contents may be stored as non-binary WML files, which are encoded into binary WML files by the WAP server 340 upon request from the WAP client 240 of the mobile telephone 1.

As appears from the above, the total WAP server functionality is divided into two separate parts; the stand-alone WAP server module 300 and the WAP contents 440 of the electronic utility device 400. This has several advantages. Firstly, all functionality data and operational parameters related to the particular electronic utility device 400 (digital camera, vending machine, etc) is defined by the device manufacturer and stored in the utility device itself. Therefore, the WAP server module 300 does not require any specific knowledge about the particulars of an individual electronic utility device, and thus the WAP server module 300 may be used with any electronic utility device, that fulfills the specification above. Moreover, the manufacturer of the device 400 does not have to bother about how the actual connection is established to the portable telecommunication apparatus; this will fully be taken care of by the intermediate WAP server module 300.

The communication between the electronic utility device 400 and the WAP server module 300 is handled by the external file and function protocol 348 and 448, which is implemented in both the WAP server module 300 and the electronic utility device 400 and allows exchange of WML pages, WML scripts as well as execution of CGI and SSI functions. The external file and function protocol 348, 448 contains a set of commands for performing the above, such as commands for initializing e.g. the serial link 33 (baudrate, etc); commands for seeking for a WML page/script or CGI/SSI function in the memory 430 of the electronic utility device 400; commands for opening and closing such a file; commands for reading from and writing to such a file; and commands for invoking CGI and SSI functions in the memory 430 of the electronic utility device 400. The external file and function protocol 348, 448 also comprises error handling.

The rest of this specification will deal with the use of the mobile telephone 1/200 of FIG. 2 for controlling the electronic utility device 440 of FIG. 4 through the WAP server module 300 of FIG. 3. Obviously, the user must be able to easily access at least his/her favorite electronic utility devices 30, 40, 50 from the mobile telephone 1. Preferably, a dynamic menu system is implemented in the mobile telephone 1, which allows the addition of a short cut menu option for connecting to a respective utility device 30, 40, 50 through a corresponding WAP server module 31, 41, 51. Preferably, the WAP server modules 31, 41, 51 are designed to transmit an initial sequence of identifying commands to the WAP client 240 of the mobile telephone 1/200, when the mobile telephone and the WAP server module are interconnected.

Thus, useful information such as physical bearer type (cable, infrared or Bluetooth), possibly an address identifier (particularly in the case of Bluetooth) as well as the name of a WML start page are submitted by the WAP server 340 to the WAP client 240 upon interconnection of the mobile telephone 1/200 and the WAP server module 300. These parameters are stored together with the respective shortcut in the dynamic menu system of the mobile telephone 1/200. Alternatively, some of the parameters above, particularly the name of the start page, may be standardized, e.g. "index-.wml". Still another alternative, at least for some physical bearers, particularly Bluetooth, is that the name of the start page is retrieved through service discovery.

Three use cases involving the mobile telephone 1 and the digital camera 50 will now be described. It is assumed that the digital camera 50 is capable of producing digital pictures and storing them locally in e.g. the flash memory 430. As described above, the digital camera 50 may be connected through a serial cable to the WAP server module 51, which in turn is connected through a serial cable 52 to the accessories interface 16 of the mobile telephone 1. Obviously, the camera could equally well have been connected via an infrared or Bluetooth interface. The WAP server module 51 is provided with the WAP server 340 shown in FIG. 3, and the digital camera 50 is provided with the WAP contents 440 shown in FIG. 4.

Initially, the user takes a few pictures using the digital camera 50. The user then connects his/her mobile telephone 1 to the WAP server module by means of the serial cable 52. A WML start page is then fetched by the WAP server 340 from the camera 50 and forwarded to the WAP client 240 across the serial cable 52, and the start page is presented on the display 13. The start page contains a plurality of controls, representing different functions of the digital camera 50. The user may for instance choose to view the pictures captured in the digital camera 50. The pictures are then sent, one by one, from the camera 50 via the WAP server 340 of the WAP server module 51/300 to the WAP client 240, which presents the pictures on the display 13 of the telephone 1.

The user may then select one of the pictures, that he/she wants to publish on the Internet 20. The user may specify a certain WAP or web server available on the Internet by filling in its HTTP (Hypertext Transfer Protocol) address in a WML form submitted from the WAP server 340. A dial-up GSM data connection 22 (FIG. 1) is established with an Internet service provider, and the WAP browser 240 of the mobile telephone 1 connects to the specified WAP or web server on the Internet. The selected picture is then sent over the link 22 for publication on the specified WAP or web server. Finally, the user disconnects the mobile telephone 1 from the WAP server module 51, wherein the logical connection between the WAP browser 240 and the WAP server 340 will be interrupted too, as well as the dial-up connection 22 to the Internet.

In the second use case, the user connects his telephone to the digital camera via the WAP server module, as described above. The start page from the digital camera is presented on the display of the telephone. The user then enters a maintenance menu provided by the digital camera. All available settings for the digital camera are presented on a WML page submitted by the WAP server 340. These settings may for instance include the following functionality: capture picture, delete picture, scroll through pictures, resolution setting, color setting, flash mode, date/time settings, etc. The user may then select any setting and change its value. The changed value will be pushed back from the WAP client 240 to the WAP server 340 according to the methods described above, wherein the WAP server 340 will recognize the changed value and invoke a CGI or SSI routine in the camera 50 for changing the setting of the digital camera 50. When the user is finished, he/she will disconnect the mobile telephone 1 from the WAP server module 51, as described above.

In a third use case it is assumed that the digital camera has a malfunction. The user notices this and connects the camera 50 to the mobile telephone 1, as described above. The WAP server 340 executes a predetermined error diagnosis WML page 438 stored in the camera 50, which in turns invokes a CGI routine of the CGI module 434. The CGI routine fetches an error code from the controller 410, and this error code is submitted together with a predetermined HTTP address by the WAP server 340 to the WAP client 240 of the mobile telephone 1. A dial-up GSM data connection 22 (FIG. 1) is established with an Internet service provider, as described above. The WAP browser 240 of the mobile telephone 1 connects to the predetermined HTTP address, which points at a help-desk web site provided by the manufacturer or supplier of the digital camera 50. The error code is then transferred to the help-desk web site, which will return a clear-text message, illustrative image, etc., which explains the nature of the error and how it is best dealt with by the user.

A fourth use case involves the vending machine 30 of FIG. 1, which is exemplified as a machine, where a user may purchase hot drinks, such as coffee, tea, cappucino, espresso, etc. The user may buy a hot drink and pay for it by using his/her mobile telephone 1. As described above, the user connects the mobile telephone 1 to the WAP server module 31 of the vending machine 30 by e.g. invoking a short cut menu option in the mobile telephone 1. A WML start page will be fetched by the WAP server module 31 through the link 33 from the memory 430 of the vending machine 30, and this start page will be transmitted across the Bluetooth link 32 to the mobile telephone 1, where the WML start page will be presented by the WAP browser 240. The start page may for instance present a welcome message, a logotype, etc.

In a subsequent WML page, the user may be presented to a form, where he/she may choose what type of hot drink to purchase. In a third WML page, the price of the purchase may be presented on the display 13, together with a question whether the user wants to complete the purchase. The user accepts the purchase, and an electronic wallet in the mobile telephone may be charged.

The present invention has been described above with reference to a preferred embodiment. However, other embodiments than the one described above are equally possible within the scope of the invention, as defined by the appended independent claims, which is readily realized by a man skilled in the art. Specifically, other physical bearers than cable, infrared and short-range radio link are possible within the scope of the invention. Also, the invention is applicable to other electronic utility devices than the ones exemplified above, including but not limited to video recorders, hifi stereos, air conditioners, refrigerators or microwave ovens.

The server module 300 may be connected to the electronic utility device 400 in other ways than the one described above (serial cable), for instance by a wireless link, an optical link, or by direct galvanic coupling (particularly if the server module 300 is realized as an integrated circuit, which may soldered onto a printed circuit board of the electronic utility device 400).

Moreover, the WAP client of the mobile telephone may be substituted for another information access program for accessing a global information network, possibly different than Internet. Correspondingly, the WAP server of the electronic utility devices may be substituted for another kind of information provider server.

What is claimed is:

1. A server device, comprising:
   a programmable controller,
   a memory coupled to the controller,
   a server program stored in the memory and executable by the controller,
   a first interface adapted to establish a first communication link to a portable telecommunication apparatus, and
   a second interface for connecting the server device to an electronic utility device,
   wherein the server program is adapted to communicate with a client program in the portable telecommunication apparatus through the first interface according to a protocol for accessing a global information network and to communicate with the electronic utility device through the second interface, so that digital information may be transferred between the portable telecommunication apparatus and the electronic utility device.

2. A server device as in claim 1, wherein the server program is adapted to receive digital control information related to a functionality of the electronic utility device from the portable telecommunication apparatus and forward this control information to the electronic utility device.

3. A server device as in claim 1, wherein the server program is adapted to retrieve digital information related to an operational status of the electronic utility device and forward this information to the portable telecommunication apparatus.

4. A server device as in claim 1, wherein the at least one protocol is a protocol for accessing the Internet.

5. A server device as in claim 1, wherein the server program comprises a WAP server.

6. A server device as in claim 5, wherein the server program is adapted to receive WML pages or WML scripts from the electronic utility device.

7. A server device as in claim 1, wherein the first communication link is a short-range radio link, an infrared link or a serial cable link.

8. A server device as in claim 1, wherein the second interface is a serial cable interface.

9. A server device as in claim 1, wherein the server device and the portable telecommunications apparatus are physically separate and distinct devices.

10. A server device as in claim 9, wherein the portable telecommunication apparatus is a cell phone.

11. A server device as in claim 1, wherein the first communications link is wireless.

12. A method of operating an electronic utility device from a portable telecommunication apparatus having a client program for accessing a global information network, comprising:
    providing a server device having a server program;
    providing a communication link, capable of transferring digital information in accordance with a protocol for accessing the global information network, between the server device and the portable telecommunication apparatus;
    connecting the electronic utility device to the server device; and
    transmitting digital information, which is related to a functionality of the electronic utility device, between the electronic utility device and the server program of the server device, and between the server program of the server device and the client program of the portable telecommunication apparatus.

13. A method as in claim 12, wherein the server program of the server device is a WAP server and the client program of the portable telecommunication apparatus is a WAP client.

14. A server device as in claim 13, wherein the first communications link is wireless and the second communications link is wireless.

15. A method as in claim 13, wherein the server device and the portable telecommunications apparatus are physically separate and distinct devices.

16. A method as in claim 13, wherein the first communications link is wireless.

17. A method as in claim 13, wherein the first communications link is wireless and the second communications link is wireless.

18. A method as in claim 12, further comprising:
    connecting to the global information network from the client program of the portable telecommunication apparatus; and
    communicating digital information between the electronic utility device and the global information network via the server program of the server device and the client program of the portable telecommunication apparatus.

19. A method as in claims 12, further comprising: storing at least a part of the digital information as WML pages and/or WML scripts in a memory of the electronic utility device.

20. A method as in claim 12, wherein the portable telecommunication apparatus is a mobile telephone.

* * * * *